US011193516B2

(12) United States Patent
Donlan et al.

(10) Patent No.: US 11,193,516 B2
(45) Date of Patent: Dec. 7, 2021

(54) THERMOSTAT RETENTION STRAP MEMBER

(71) Applicant: Appleton Grp LLC, Rosemont, IL (US)

(72) Inventors: Andrew J. Donlan, Guelph (CA); Paul E. Mazur, Kitchener (CA); Jacob Holfeuer, Kitchener (CA)

(73) Assignee: Appleton Grp LLC, Rosemont, IL (US)

( * ) Notice: Subject to any disclaimer, the term of this patent is extended or adjusted under 35 U.S.C. 154(b) by 1 day.

(21) Appl. No.: 16/704,397

(22) Filed: Dec. 5, 2019

(65) Prior Publication Data

US 2021/0131464 A1 May 6, 2021

Related U.S. Application Data

(63) Continuation-in-part of application No. 29/711,710, filed on Nov. 1, 2019, now Pat. No. Des. 891,749, and a continuation-in-part of application No. 29/711,512, filed on Oct. 31, 2019, now Pat. No. Des. 923,723, and a continuation-in-part of application No. 29/711,519, filed on Oct. 31, 2019, now Pat. No. Des. 920,822.

(51) Int. Cl.
*F16B 2/08* (2006.01)
*F16L 55/17* (2006.01)
*F24H 9/20* (2006.01)
*F16L 55/07* (2006.01)

(52) U.S. Cl.
CPC ............... *F16B 2/08* (2013.01); *F24H 9/20* (2013.01); *F16L 55/07* (2013.01); *F16L 55/17* (2013.01)

(58) Field of Classification Search
USPC .................................. 248/74.3, 228.8, 230.8
See application file for complete search history.

(56) References Cited

U.S. PATENT DOCUMENTS

| | | | | | |
|---|---|---|---|---|---|
| 5,213,750 | A | * | 5/1993 | Knapp | B29C 53/20 219/535 |
| 6,640,393 | B2 | * | 11/2003 | Wendle | B65D 63/1027 24/16 PB |
| 7,854,414 | B2 | * | 12/2010 | Head | E21B 17/1035 248/61 |

(Continued)

OTHER PUBLICATIONS

Emerson Catalog, "EasyHeat AHB Cable: Pipe Freeze Protection, Constant Wattage, Pre-Terminated. For Residential Applications.", 2017, 2 pages.

*Primary Examiner* — Alfred J Wujciak
(74) *Attorney, Agent, or Firm* — McDonnell Boehnen Hulbert & Berghoff LLP

(57) ABSTRACT

A thermostat retention strap member including a thermostat housing, a thermostat positioned in the thermostat housing and upwardly extending from an upper surface of the thermostat housing, a first electrical cable extending into a first end of the thermostat housing, a second electrical cable extending into a second end of the thermostat housing, a retention strap extending from a first side of the thermostat housing, a retention strap receptacle positioned on a second side of the thermostat housing, wherein the retention strap is adapted to extend around a water pipe such that when the retention strap is extended through the retention strap receptacle the thermostat is in engagement with the water pipe.

4 Claims, 13 Drawing Sheets

(56) References Cited

U.S. PATENT DOCUMENTS

| | | | |
|---|---|---|---|
| 2007/0075071 A1* | 4/2007 | Cardenas | H05B 3/56 |
| | | | 219/549 |
| 2007/0181561 A1* | 8/2007 | Turletes | H05B 3/34 |
| | | | 219/528 |
| 2017/0284870 A1 | 10/2017 | Golden et al. | |
| 2017/0364103 A1* | 12/2017 | Herrera | F16K 31/04 |

* cited by examiner

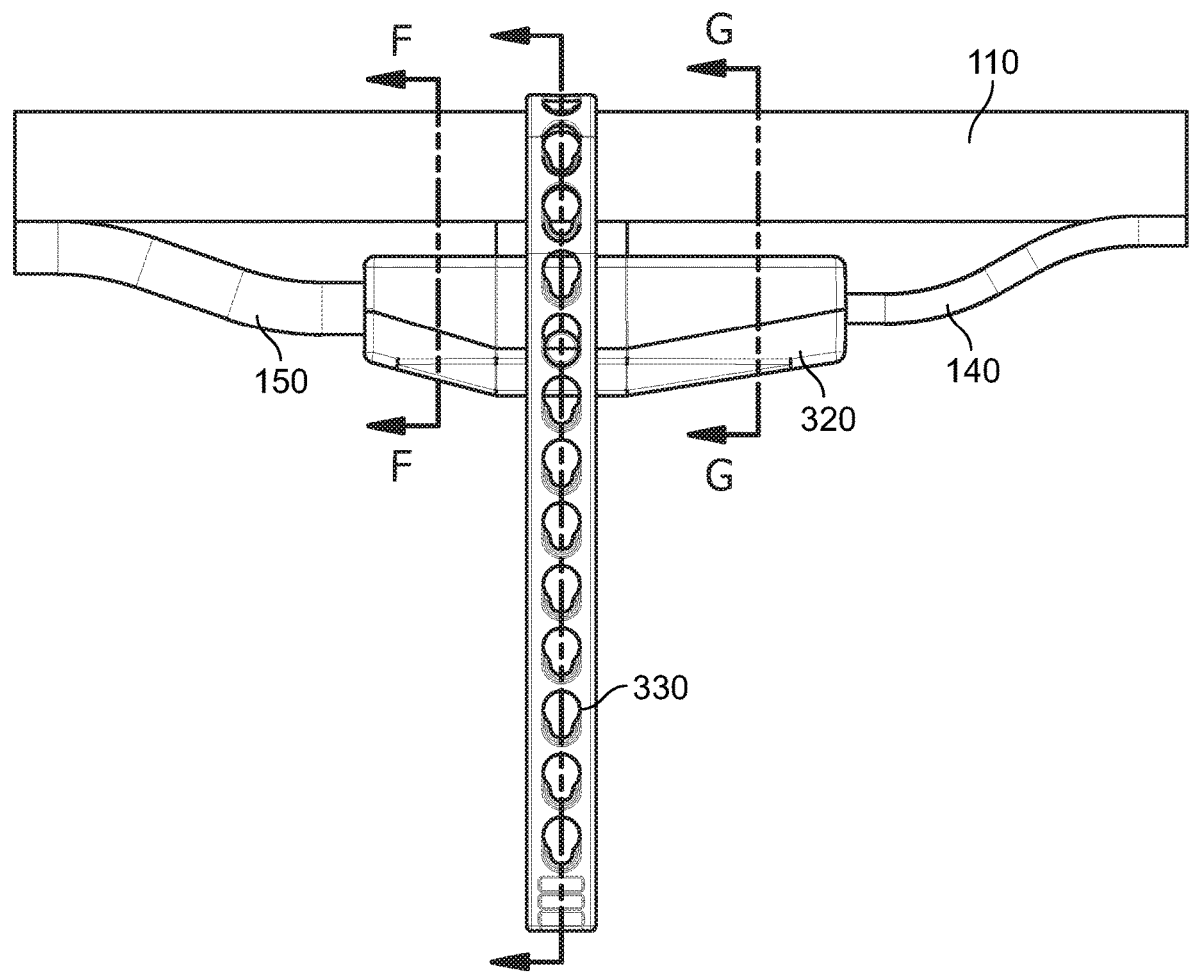
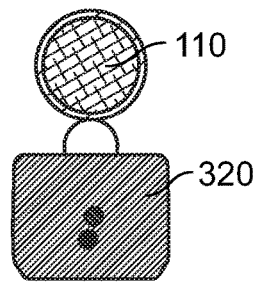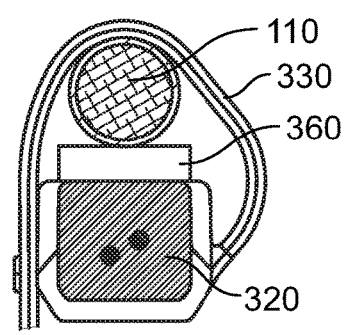
FIG. 3E
FIG. 3F        FIG. 3G

THERMOSTAT RETENTION STRAP MEMBER

RELATED APPLICATIONS

This application claims priority to U.S. Design patent applications Nos. 29/711,510, 29/711,512, and 29/711,519 filed on Oct. 31, 2019 each entitled "Thermostat Retention Member," the contents of which are incorporated by reference herein in their entirety.

FIELD

The present disclosure relates to the field of providing a thermostat to control a heating cable for freeze protection of water pipes. More particularly, the present disclosure is directed to a strap for maintaining a thermostat in contact with a water pipe. The water pipe may be used to direct water to residential or agricultural type applications.

BACKGROUND

It is important for the thermostat to be in contact with the water pipe to monitor the temperature of the water pipe. If the temperature falls toward a freezing temperature, i.e. 32 degrees Fahrenheit, a heating cable is energized to warm the pipe and keep it from freezing. If the thermostat comes out of contact with the water pipe, an inaccurate temperature reading of the water pipe will occur which may result in a frozen pipe and cause a hazardous situation. Further, if the thermostat is out of contact with the water pipe, the temperature of the thermostat will not be the same as the actual temperature of the pipe and could result in unnecessary energization of the heating cable and eventual overheating of the pipe and heating cable materials. In the past, electrical tape was used to secure the thermostat to the water pipe. However, over time the electrical tape can degrade and cause a loose connection between the thermostat and the water pipe. In some cases, installers would even overlook installing the electrical tape to attach the thermostat to the pipe. Therefore, it would be desirable to provide an improved, easy-to-use device for securing the thermostat to the water pipe.

SUMMARY

The present embodiments advantageously provide a thermostat retention strap member that is used to secure a thermostat to the water pipe. Several different thermostat retention strap designs are provided. In a first embodiment, a "zipper" strap design is employed. The "zipper" strap extends from a thermostat housing and has teeth that extend through a strap receptacle on the thermostat housing which secures the strap into tight engagement around the water pipe. In a second embodiment, a beaded strap is employed. The beaded strap extends from a thermostat housing and beads on the strap extend through a strap receptacle on the thermostat housing which secures the strap into tight engagement around the water pipe. In a third embodiment, a "keyhole" strap design is employed. In this design, the strap extends from a thermostat housing and includes a number of holes such that one of the holes on the strap extends over an extension on the thermostat housing to secure the strap into tight engagement around the water pipe.

In one aspect, a thermostat retention strap member is provided including a thermostat housing, a thermostat positioned in the thermostat housing and upwardly extending from an upper surface of the thermostat housing, a first electrical cable extending into a first end of the thermostat housing, a second electrical cable extending into a second end of the thermostat housing; a retention strap extending from a first side of the thermostat housing, a retention strap receptacle positioned on a second side of the thermostat housing, wherein the retention strap is adapted to extend around a water pipe such that when the retention strap is extended through the retention strap receptacle the thermostat is in engagement with the water pipe In another aspect, a thermostat retention strap member is provided including a thermostat housing, a thermostat positioned in the thermostat housing and upwardly extending from an upper surface of the thermostat housing, a first electrical cable extending into a first end of the thermostat housing, a second electrical cable extending into a second end of the thermostat housing, a retention strap extending from a first side of the thermostat housing, retention strap receptacle positioned on a second side of the thermostat housing, wherein the retention strap is adapted to extend around a water pipe such that when the retention strap is extended through the retention strap receptacle the thermostat is in engagement with the water pipe In a further aspect, a method is provided comprising the steps of: (i) providing a thermostat retention strap member including a thermostat housing, a thermostat positioned in the thermostat housing and upwardly extending from an upper surface of the thermostat housing, a first electrical cable extending into a first end of the thermostat housing, a second electrical cable extending into a second end of the thermostat housing, a retention strap extending from a first side of the thermostat housing, a retention strap receptacle positioned on a second side of the thermostat housing, wherein the retention strap is adapted to extend around a water pipe such that when the retention strap is extended through the retention strap receptacle the thermostat is in engagement with the water pipe; (ii) extending the retention strap over the water pipe; and (iii) extending the retention strap through the retention strap receptacle to position the thermostat in engagement with the water pipe.

In yet a further aspect, a method is provided comprising the steps of: (i) providing a thermostat retention strap member including a thermostat housing, a thermostat positioned in the thermostat housing and upwardly extending from an upper surface of the thermostat housing, a first electrical cable extending into a first end of the thermostat housing, a second electrical extending into a second end of the thermostat housing, a retention strap extending from a first side of the thermostat housing, a retention strap receptacle positioned on a second side of the thermostat housing, wherein the retention strap is adapted to extend around a water pipe such that when the retention strap is extended through the retention strap receptacle the thermostat is in engagement with the water pipe; (ii) extending the retention strap over the water pipe; and (iii) extending the retention strap through the retention strap receptacle to position the thermostat in engagement with the water pipe.

BRIEF DESCRIPTION OF THE FIGURES

FIG. 3E is a side view of thermostat retention strap member 30 with retention strap 330 extending around water pipe 110 and engaged with extension 332.

FIG. 3F is a cross-sectional view of thermostat housing 320 taken along lines F-F in FIG. 3E.

FIG. 3G is a cross-sectional view of thermostat housing 320 taken along lines G-G in FIG. 3E.

DETAILED DESCRIPTION

Figure 1A:
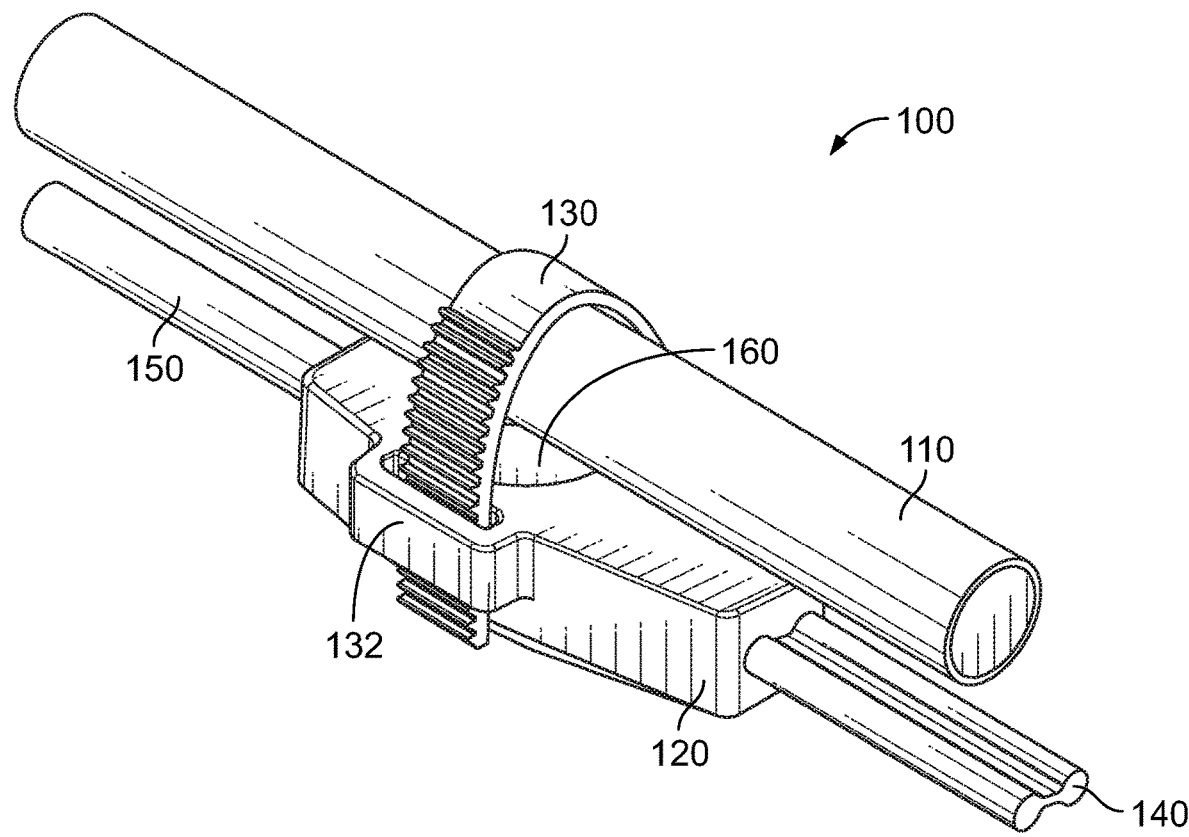
FIG. 1A is a perspective view of thermostat retention strap member 100.

FIGS. 1A-1H are directed to thermostat retention strap member 100 which includes thermostat housing 120, a thermostat 160 positioned in thermostat housing 120 and extending from an upper surface of thermostat housing 120, a first electrical cable 150 extending into a first end of thermostat housing 120, and a second electrical cable 140 extending into a second end of thermostat housing 120.

Thermostat retention strap member 100 further includes a retention strap 130 extending from a first side of the thermostat housing 120 and a retention strap receptacle 132 extending from a second side of thermostat housing 120. Retention strap 130 includes a plurality of teeth 134 that are adapted to engage one or more mating teeth 133 positioned within the retention strap receptacle 132 as shown in FIG. 1H.

Figure 1B:
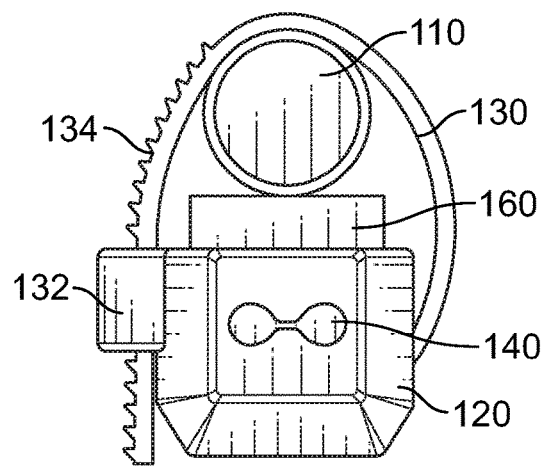
FIG. 1B is a side view of thermostat retention strap member 100 shown in FIG. 1A, with thermostat 160 positioned within thermostat housing 120 engaged with water pipe 110.

As shown in FIGS. 1A and 1B, the water pipe 110 is positioned on top of, and in contact with, thermostat 160. Retention strap 130 is placed over water pipe 110 and then extended through retention strap receptacle 132 to retain water pipe 110 in secure contact with thermostat 160.

Figure 1C:
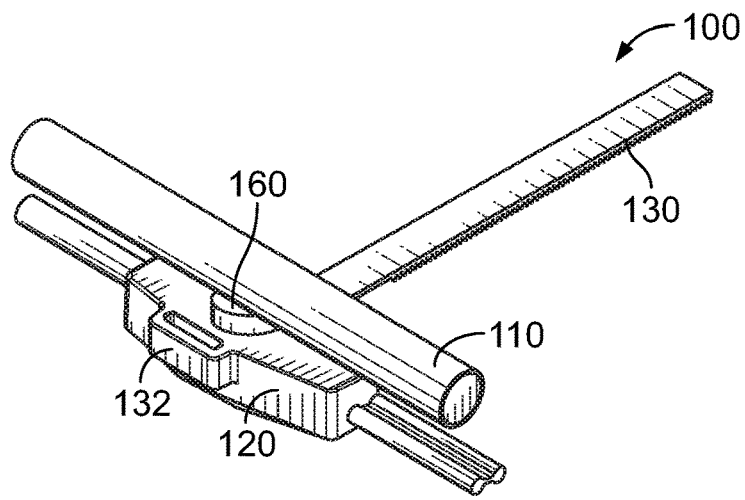
FIG. 1C is another perspective view of thermostat retention strap member 100.
Figure 1D:
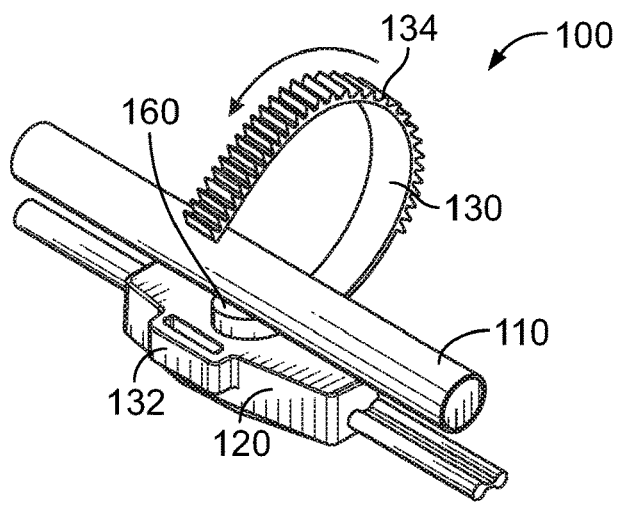
FIG. 1D is a perspective view of thermostat retention strap member 100 illustrating retention strap 130 being extended around water pipe 110.
Figure 1E:
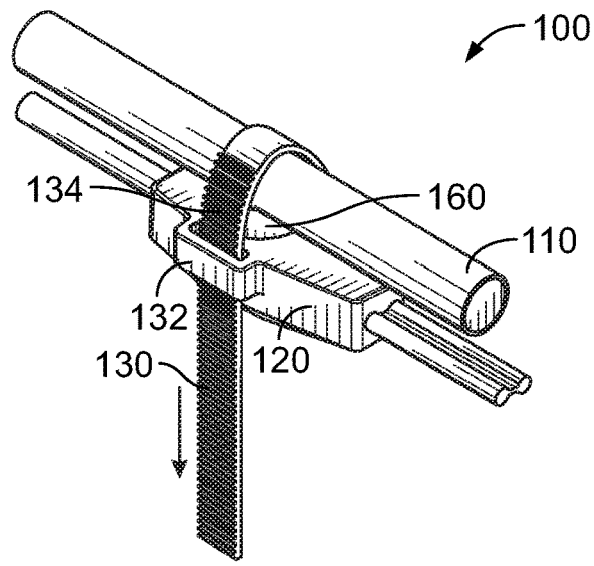
FIG. 1E is a perspective view of thermostat retention strap member 100 after retention strap 130 has been extended through retention strap receptacle 132.
Figure 1F:
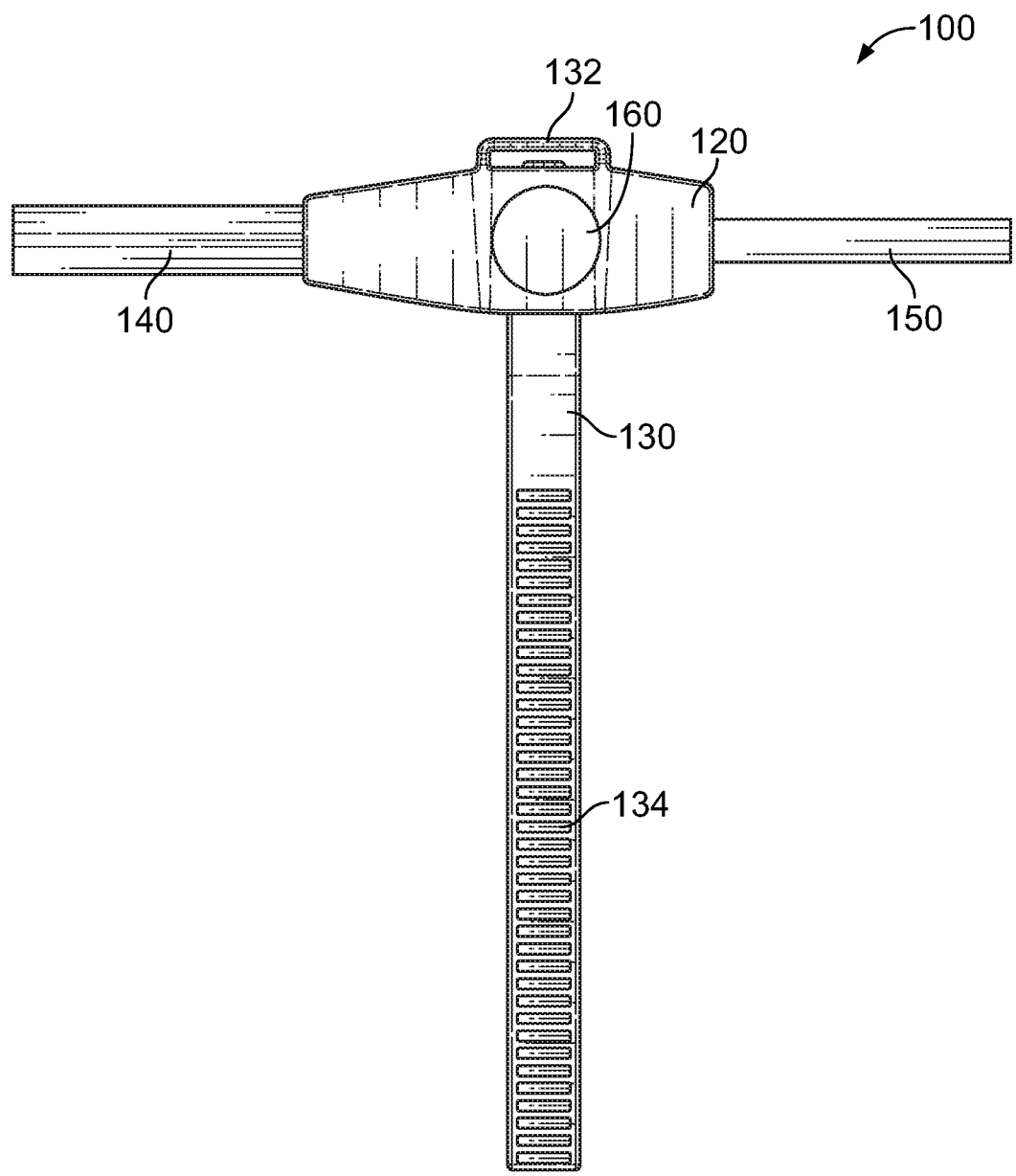
FIG. 1F is a top view of thermostat retention strap member 100 with retention strap 130 extending from thermostat housing 120 with thermostat 160 positioned within thermostat housing 120.
Figure 1G:
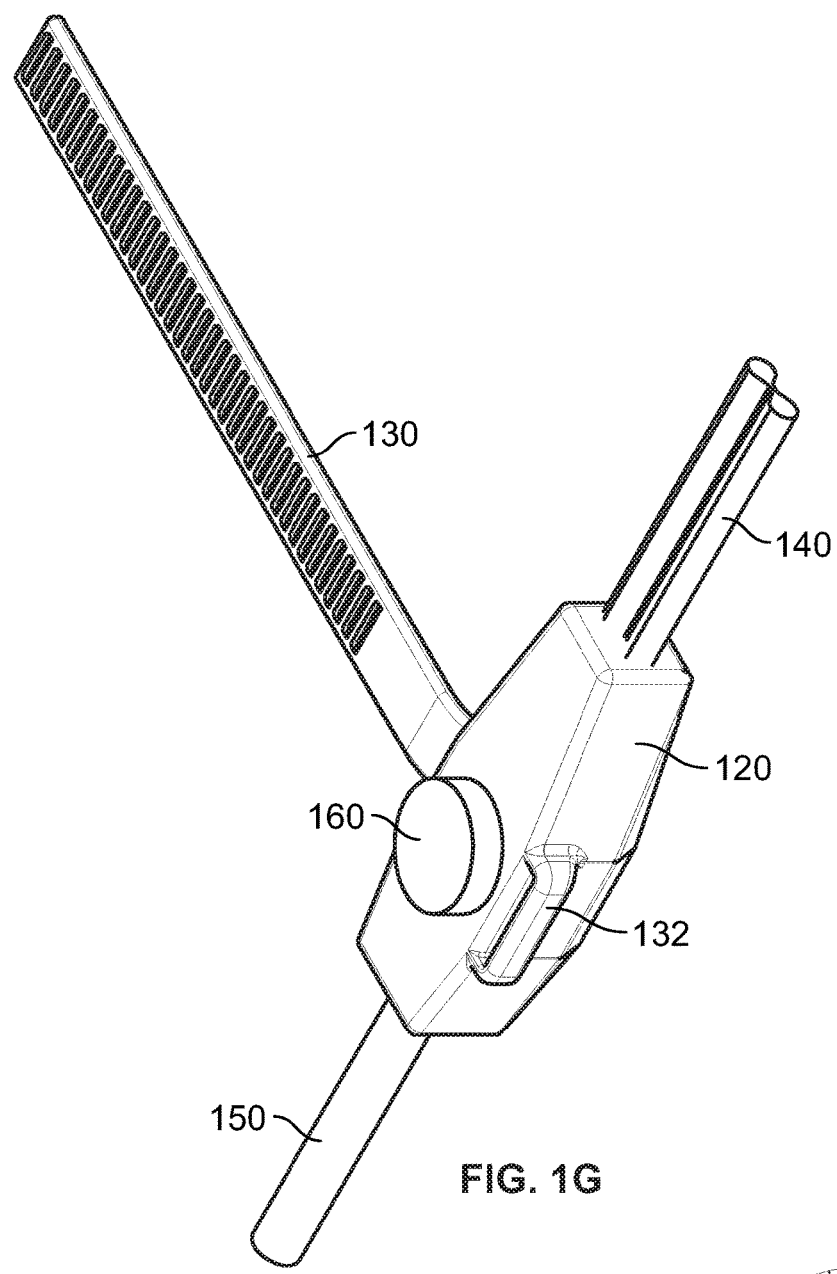
FIG. 1G is another perspective view of thermostat retention strap member 100.
Figure 1H:
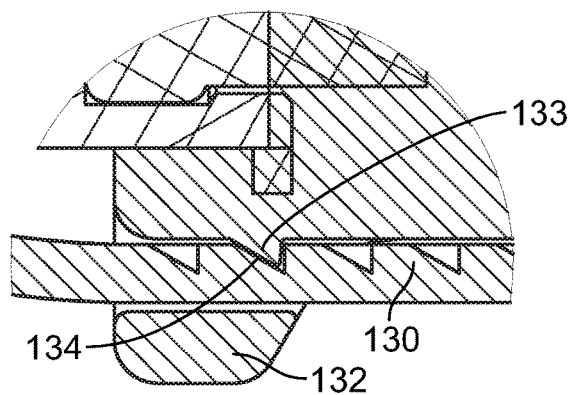
FIG. 1H is a cross-sectional view showing teeth on retention strap 130 in mating engagement with teeth positioned within retention strap receptacle 132.

As shown in FIGS. 1C-1E, the water pipe 110 is initially placed on top of thermostat 160. Then retention strap 130 is rotated over the water pipe 110, and extended through retention strap receptacle 132 to securely maintain contact between water pipe 110 and thermostat 160.

FIGS. 2A-2E are directed to thermostat retention strap member 200, which includes thermostat housing 220, a thermostat 160 position in thermostat housing 220 and extending from an upper surface of thermostat housing 220, a first electrical cable 150 extending into a first end of thermostat housing 220, and a second electrical cable 140 extending into a second end of thermostat housing 220.

Thermostat retention strap member 200 further includes a retention strap 230 extending from a first side of the thermostat housing 220 and a retention strap receptacle 232 extending from a second side of thermostat housing 220. Retention strap 230 includes a plurality of beads 234 having a flared rear section 235 that s adapted to engage a lower inner surface 233 of retention strap receptacle 232 as shown in FIGS. 2C and 2E.

To secure the retention strap 230, the strap is extended through the retention strap receptacle 232. The flared rear section 235 of the bead 234 is compressed as it passes through an opening in the retention strap receptacle 232. Once bead 234 passes through the opening in the retention strap receptacle 232, the flared rear section 235 becomes uncompressed and the flared rear section 235 abuts lower inner surface 233 of retention strap receptacle 232 to lock the retention strap 230 into position within the retention strap receptacle 232.

Figure 2A:
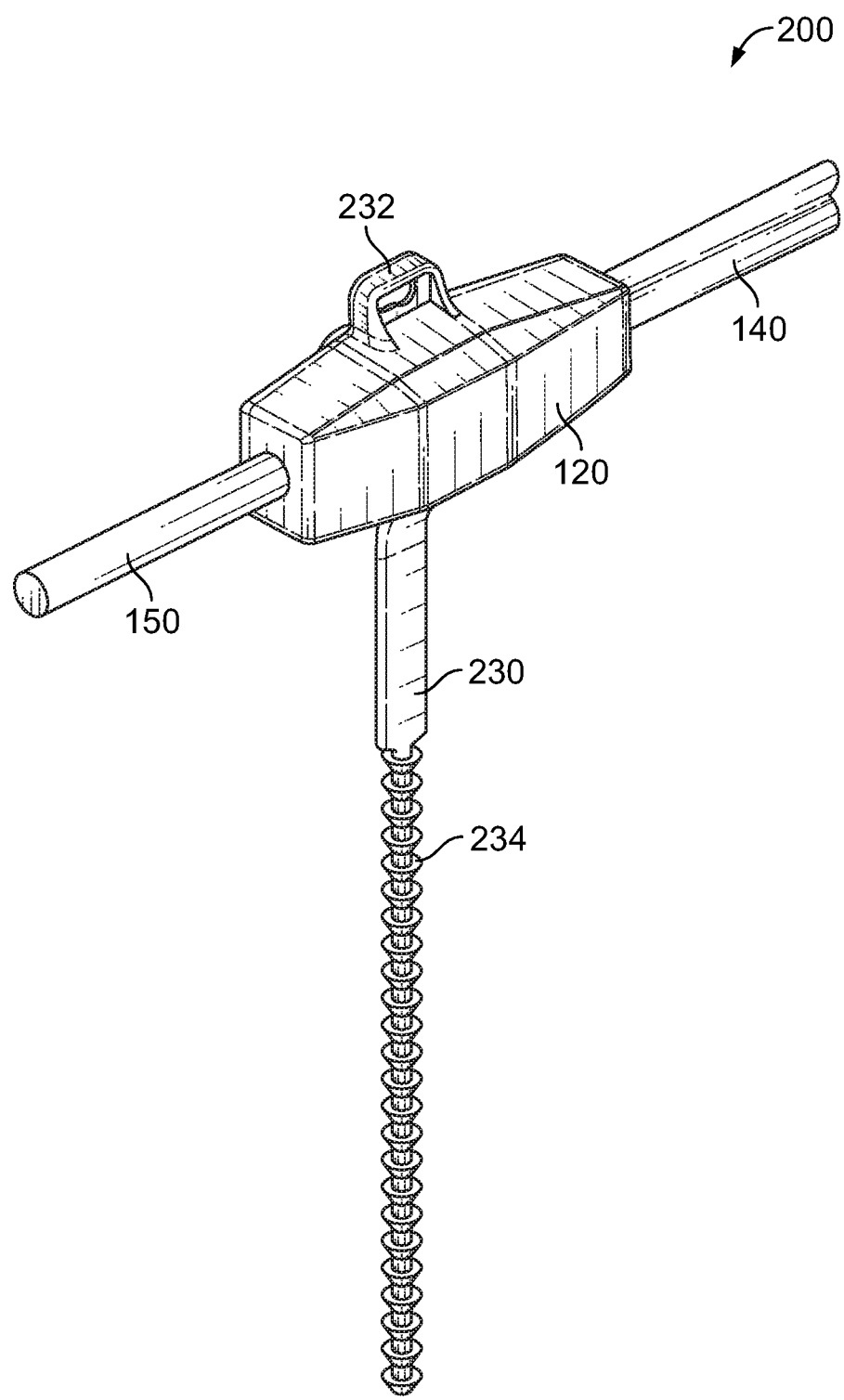
FIG. 2A is a perspective view of thermostat retention strap member 200, with retention strap 230 having a plurality of beads extending from thermostat housing 120.
Figure 2B:
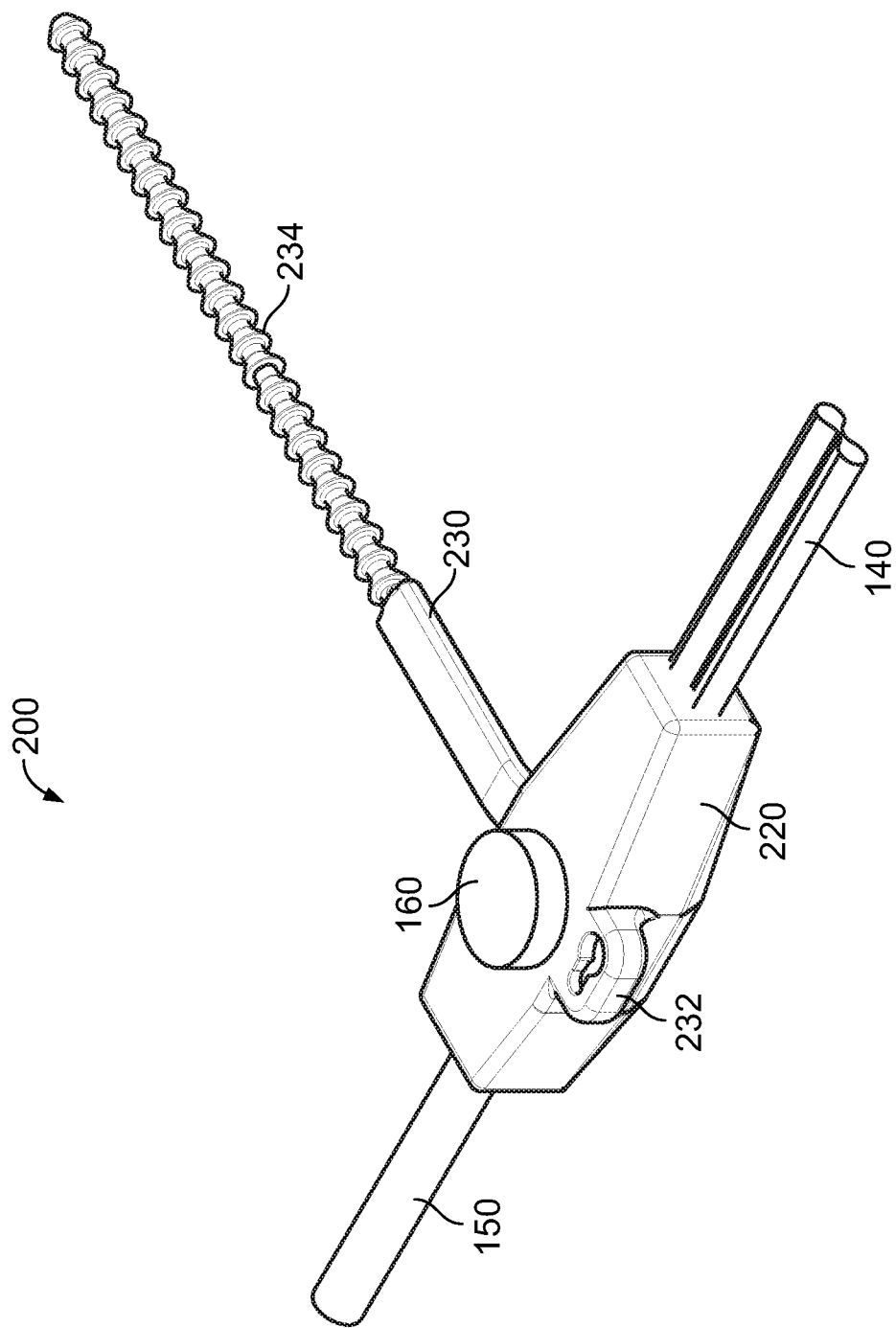
FIG. 2B is another perspective view of thermostat retention strap member 200 with thermostat 160 positioned within thermostat housing 220.
Figure 2C:
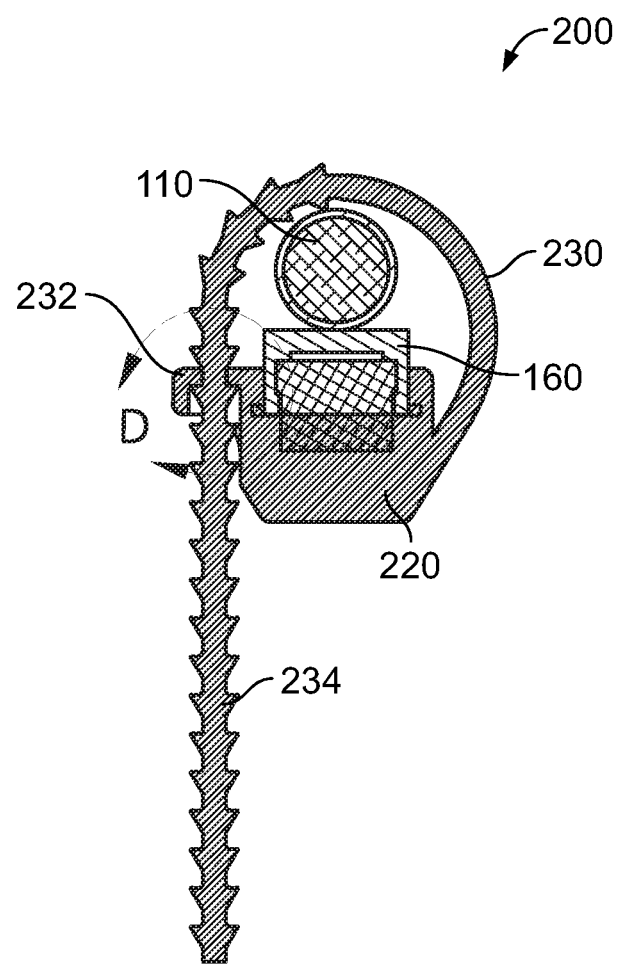
FIG. 2C is a cross-sectional view of thermostat retention strap member 200 with beaded strap 230 extending around water pipe 110 and extending through retention strap receptacle 232 and thermostat 160 engaged with water pipe 110.
Figure 2D:
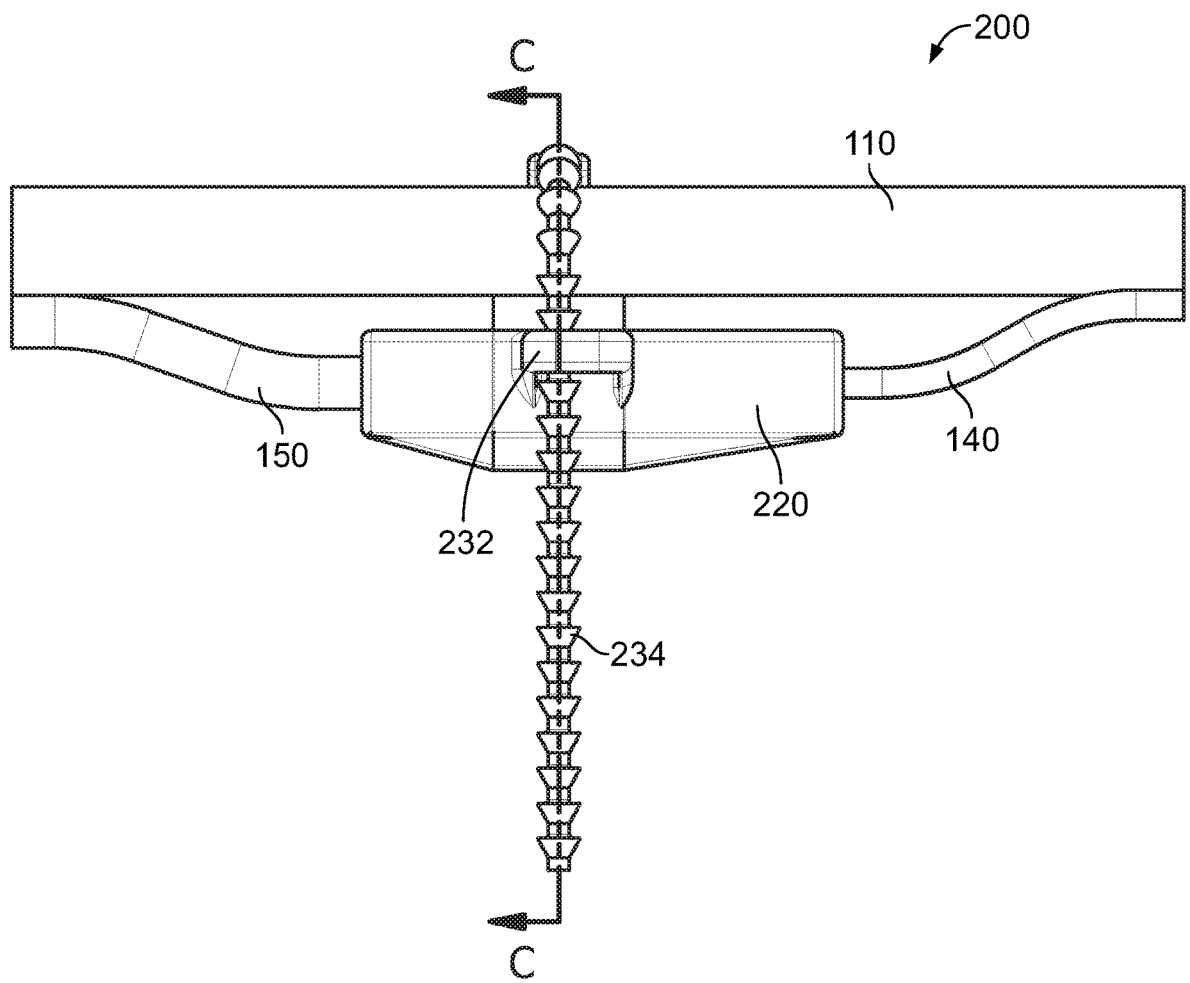
FIG. 2D is a side view of thermostat retention strap member 200 with beaded strap 230 extending around water pipe 110 and extending through retention strap receptacle 232.
Figure 2E:
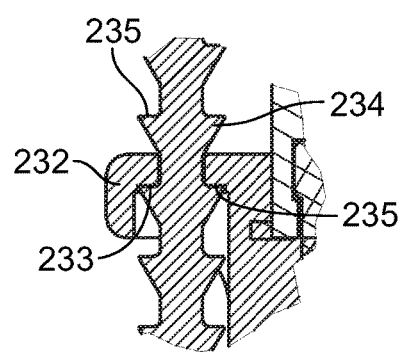
FIG. 2E is a cross-sectional view of bead 234 extending through retention strap receptacle 232 and in locked engagement with retention strap receptacle 232.

As shown in FIG. 2C, the water pipe 110 is positioned on top of, and in contact with, thermostat 160. Retention strap 230 is placed over water pipe 110 and then extended through retention strap receptacle 232 to retain water pipe 110 in secure contact with thermostat 160.

As with thermostat retention strap member 100, the water pipe 110 is initially placed on top of thermostat 160. Then, as depicted in FIG. 2C, retention strap 230 is rotated over the water pipe 110, and extended through retention strap receptacle 232 to securely maintain contact between water pipe 110 and thermostat 160.

FIGS. 3A-3G are directed to thermostat retention strap member 300, which includes thermostat housing 320, a thermostat 360 position in thermostat housing 320 and extending from an upper surface of thermostat housing 320, a first electrical cable 150 extending into a first end of thermostat housing 320, and a second electrical cable 140 extending into a second end of thermostat housing 320.

Thermostat retention strap member 300 further includes a retention strap 330 extending from a first side of the thermostat housing 320 and an extension 332 extending from a second side of thermostat housing 320. Retention strap 330 includes a plurality of holes 334 that are adapted to fit over extension 332 to secure a water pipe 110 in contact with thermostat 360 as shown in FIG. 3D.

Figure 3A:
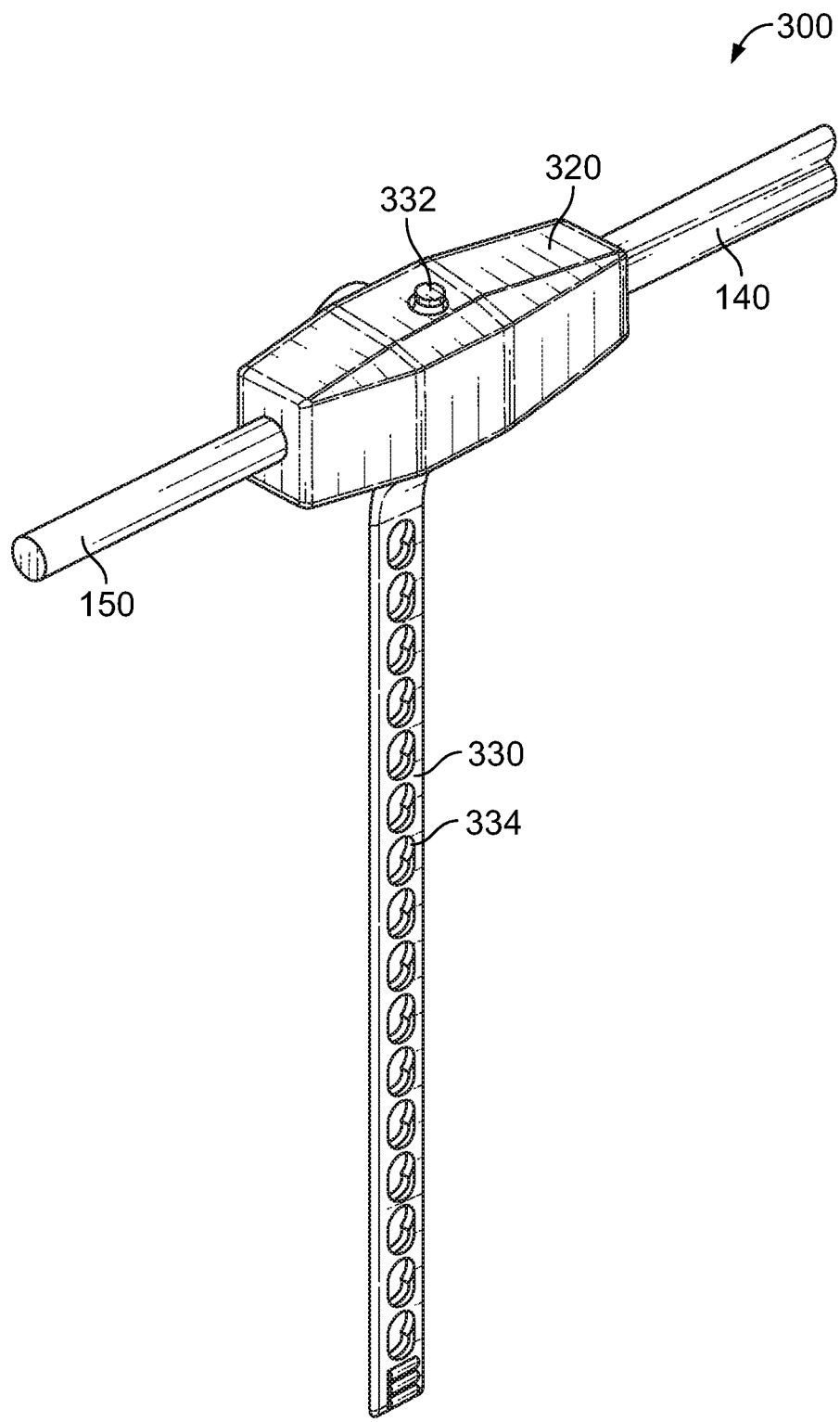
FIG. 3A is a perspective view of thermostat retention strap member 300 with retention strap 330 having a plurality of holes 334 extending from thermostat housing 320.
Figure 3B:
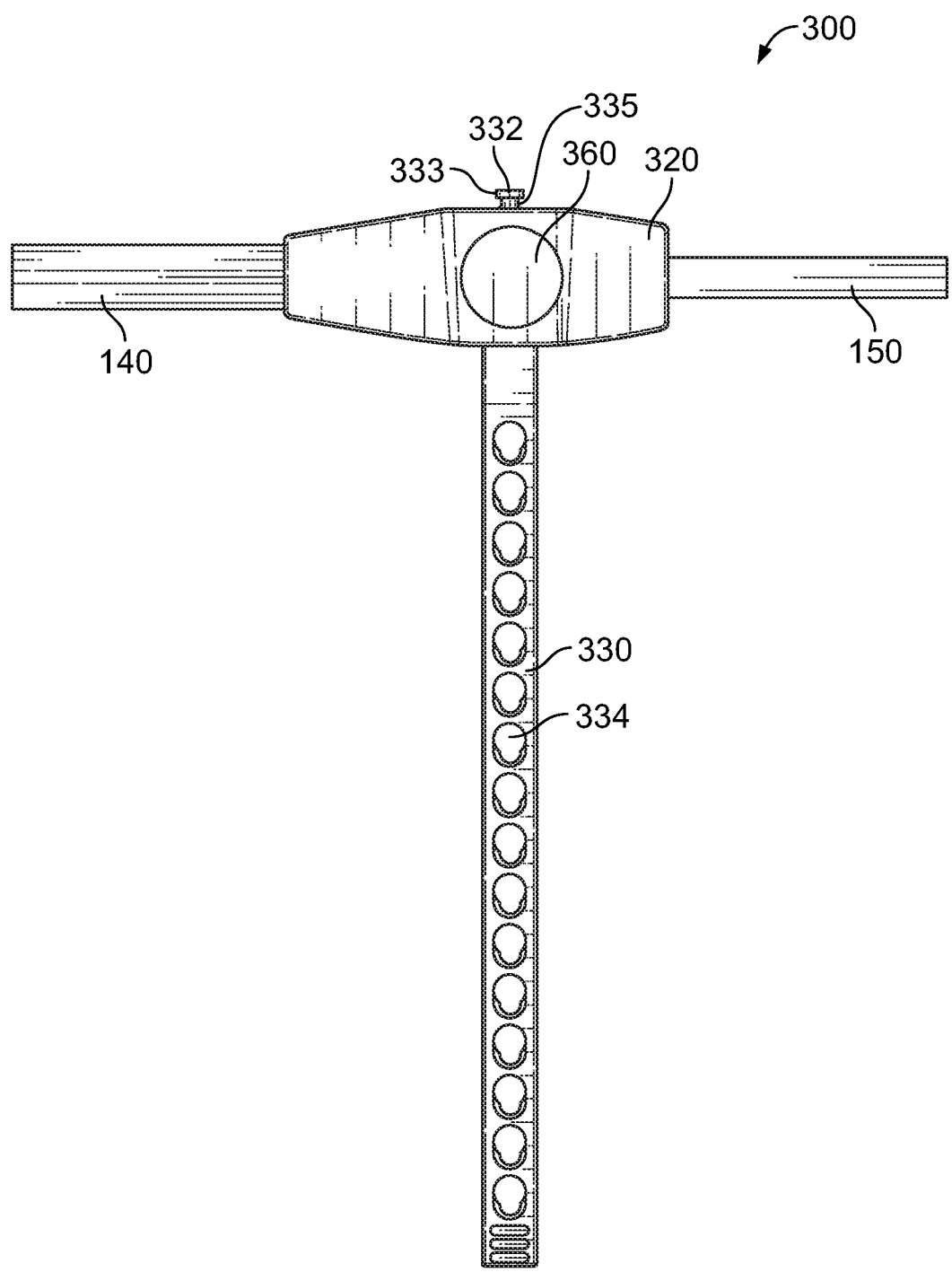
FIG. 3B is a top view of thermostat retention strap member 300 with retention strap 330 extending from thermostat housing 320 with thermostat 360 positioned within thermostat housing 320.
Figure 3C:
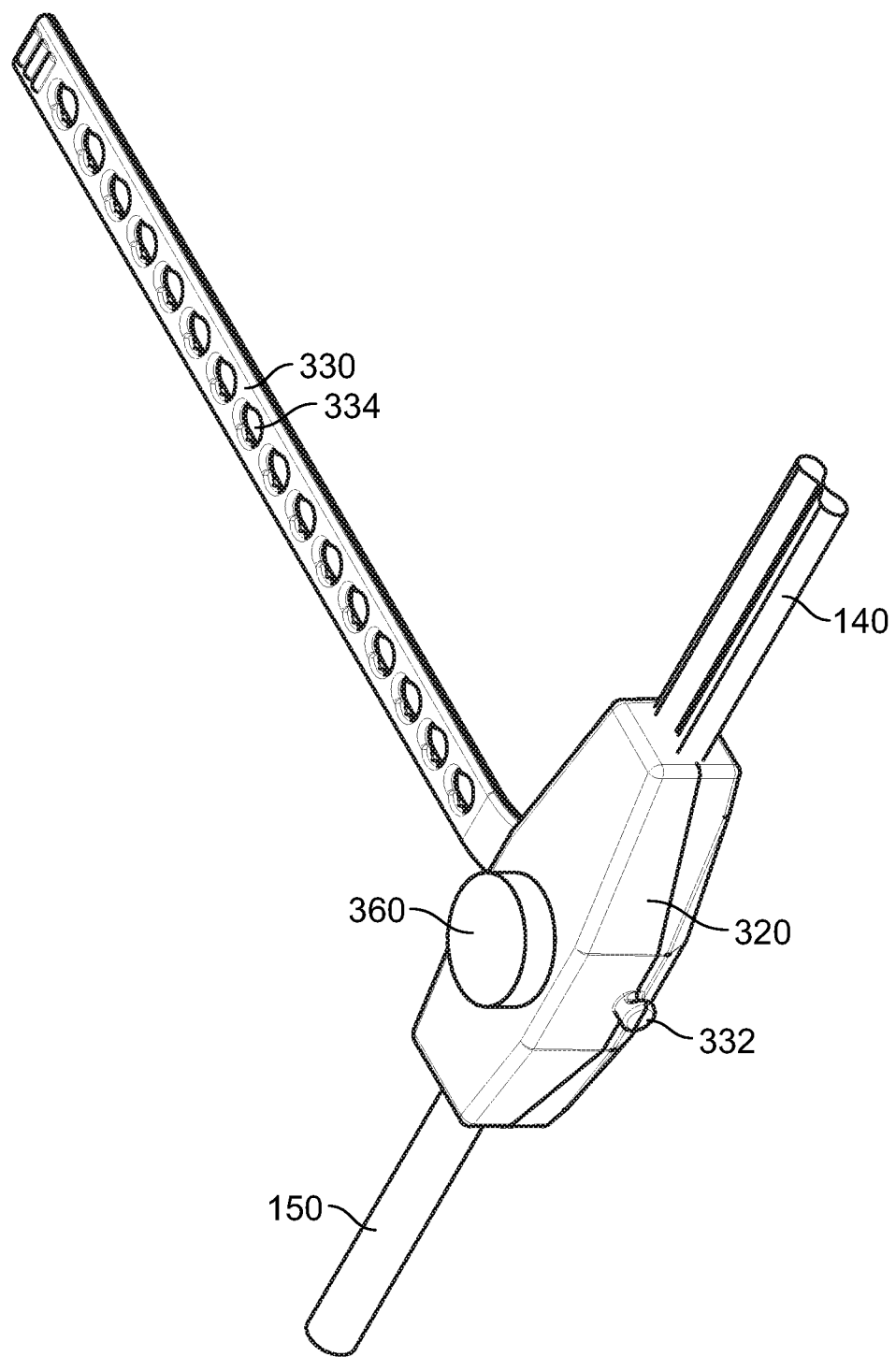
FIG. 3C is another perspective view of thermostat retention strap member 300.
Figure 3D:
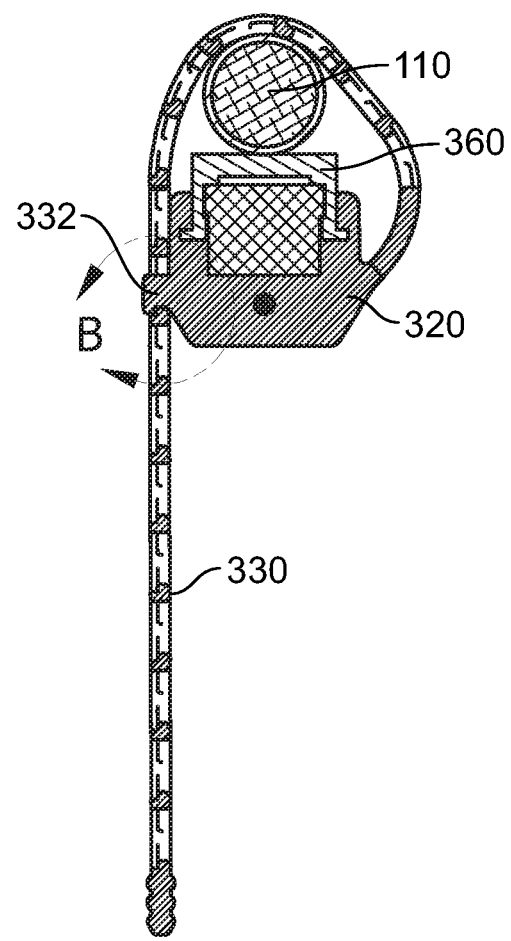
FIG. 3D is a cross-sectional view of thermostat retention strap member 300 with retention strap 330 extending around water pipe 110 and engaged with extension 332 and thermostat 360 in contact with water pipe 110.

As shown in FIG. 3D, the water pipe 110 is positioned on top of, and in contact with, thermostat 360. Retention strap 330 is placed over water pipe 110 and then one of the holes in retention strap 330 is placed over extension 332 to retain water pipe 110 in secure contact with thermostat 360.

As with thermostat retention strap members 100 and 200, the water pipe 110 is initially placed on top of thermostat 360. Then, as depicted in FIG. 3D, retention strap 330 is rotated over the water pipe 110, and a hole in the retention strap 330 is engaged with extension 332 to securely maintain contact between water pipe 110 and thermostat 360.

The holes 334 on the retention strap 330 have a first portion with a first width and a second portion with a second width which is less than the first width. The retention strap 330 is stretchable such that the first portion may be placed over the extension 332 and then the second portion engages the extension. The extension 332 has an upper portion 333 with a first width and a lower portion 335 with a second width which is less than the first width.

Once the first portion of the hole 334 in the retention strap 330 is stretched and extended over upper portion 333 of extension 332, the retention strap 330 attempts to return to an unstretched position such that the second portion of the hole 334 engages the lower portion 335 of extension 332.

Retention strap 130 can be made of the same material as housing 120, and can be PVC, 12001-082, and can be molded at the same time as the housing 120. Retention straps 230 and 330 can be made of the same material. Each of retention straps 130, 230, and 330 has a sufficient length to accommodate water pipes of varying diameters. For example, retention straps 130, 230, and 330 may accommodate pipes with diameters varying from 3/8" to 1½."

We claim:

1. A thermostat retention strap member comprising:
   a thermostat housing;
   a thermostat positioned in the thermostat housing and upwardly extending from an upper surface of the thermostat housing;
   a first electrical cable extending into a first end of the thermostat housing;
   a second electrical extending into a second end of the thermostat housing;
   a retention strap having an end attached to and extending from a first side of the thermostat housing, the retention strap having a plurality of holes;
   an extension positioned on a second side of the thermostat housing, where the second side of the thermostat housing is opposite from the first side of the thermostat housing, and where the extension outwardly extends from the second side of the thermostat housing;
   wherein the retention strap is adapted to extend around a water pipe such that when one of the holes of the retention strap is extended over the extension the thermostat is in engagement with the water pipe.

2. The thermostat retention strap member of claim 1, wherein the holes on the retention strap have a first portion with a first width and a second portion with a second width which is less than the first width.

3. The thermostat retention strap member of claim 2, wherein the retention strap is stretchable such that the first portion may be placed over the extension and then the second portion engages the extension.

4. The thermostat retention strap member of claim 3, wherein the extension has an upper portion with a first width and a lower portion with a second width which is less than the first width.

* * * * *